(12) United States Patent
Nurijanyan et al.

(10) Patent No.: US 10,222,497 B2
(45) Date of Patent: Mar. 5, 2019

(54) MULTI-STACK (BROADBAND) WAVELET ESTIMATION METHOD

(71) Applicant: CGG SERVICES SAS, Massy (FR)

(72) Inventors: Shavarsh Nurijanyan, Amsterdam (NL); Harry Debeye, The Hague (NL); Peter Mesdag, Delft (NL); Menne Schakel, The Hague (NL)

(73) Assignee: CGG SERVICES SAS, Massy (FR)

( * ) Notice: Subject to any disclaimer, the term of this patent is extended or adjusted under 35 U.S.C. 154(b) by 15 days.

(21) Appl. No.: 15/412,847

(22) Filed: Jan. 23, 2017

(65) Prior Publication Data

US 2017/0219727 A1    Aug. 3, 2017

Related U.S. Application Data

(60) Provisional application No. 62/290,472, filed on Feb. 3, 2016.

(51) Int. Cl.
| | |
|---|---|
| *G06F 11/30* | (2006.01) |
| *G01V 1/30* | (2006.01) |
| *G01V 1/36* | (2006.01) |
| *G01V 1/28* | (2006.01) |

(52) U.S. Cl.
CPC .............. *G01V 1/30* (2013.01); *G01V 1/282* (2013.01); *G01V 1/306* (2013.01); *G01V 1/307* (2013.01); *G01V 1/362* (2013.01); *G01V 2210/614* (2013.01); *G01V 2210/6169* (2013.01); *G01V 2210/624* (2013.01); *G01V 2210/6242* (2013.01); *G01V 2210/63* (2013.01)

(58) Field of Classification Search
CPC ........................................................ G01V 1/30
See application file for complete search history.

(56) References Cited

U.S. PATENT DOCUMENTS

| | | |
|---|---|---|
| 8,547,785 B2 | 10/2013 | Sorli |
| 8,711,654 B2 | 4/2014 | Moldoveanu et al. |
| 8,760,964 B2 | 6/2014 | Moldoveanu et al. |
| 8,949,030 B2 | 2/2015 | Ferber |

(Continued)

OTHER PUBLICATIONS

M.D. Schakel et al: "Fully data-driven quantitative reservoir characterization by broadband seismic", SEG Tech Program Expanded Abstracts 2014, Aug. 5, 2014 (Aug. 5, 2014), pp. 2502-2506, XP055380438, DOI: 10-1190/segam 20140671.1.*

(Continued)

*Primary Examiner* — Phuong Huynh
(74) *Attorney, Agent, or Firm* — Patent Portfolio Builders PLLC

(57) ABSTRACT

Computing device, computer instructions and method for estimating a broadband wavelet associated with a given seismic data set. The method includes receiving broadband seismic data; constructing and populating a misfit function; calculating the broadband wavelet based on the misfit function and the broadband seismic data; and estimating physical reservoir properties of a surveyed subsurface based on the broadband wavelet. The broadband wavelet is constrained, through the misfit function, by (1) an amplitude only long wavelet, and (2) an amplitude and phase short wavelet. The amplitude and phase short wavelet is shorter in time than the amplitude only long wavelet.

20 Claims, 8 Drawing Sheets

(56) References Cited

U.S. PATENT DOCUMENTS

| | | | |
|---|---|---|---|
| 2004/0199330 A1* | 10/2004 | Routh | G01V 1/28 702/14 |
| 2009/0122640 A1 | 5/2009 | Hill et al. | |
| 2013/0028045 A1* | 1/2013 | Ferber | G01V 1/3808 367/16 |
| 2013/0107663 A1 | 5/2013 | Moldoveanu et al. | |
| 2013/0188448 A1 | 7/2013 | Siliqi et al. | |
| 2014/0121977 A1 | 5/2014 | Lecocq | |

OTHER PUBLICATIONS

Guanghe Liang et al: "Using high-order cumulants: to extrapolate spatially variant seimic wavelets", GEOPHYICS, vol. 67, No. 6, Nov. 30, 2002 (Nov. 30, 2002), pp. 1869-1876, XP 055381660, US ISSN: 0016-8033, DOI: 10.1190/1.1527086.*

Extended European Search Report issued in corresponding EP Application No. 17305080.8-1559, dated Jun. 23, 2017.

G. Liang et al., "Using high-order cumulants to extrapolate spatially variant seismic wavelets," Geophysics, vol. 67, No. 6; pp. 1869-1876; Nov.-Dec. 2002.

C.P. Ashton et al., "3D Seismic Survey Design", Oilfield Review, Apr. 1994, pp. 19-32.

M. Buia et al., "Shooting Seismic Surveys in Circles" Oilfield Review, Autumn 2008, pp. 18-31.

E. Kneller et al., "Benefits of Broadband Seismic Data for Reservoir Characterization. Santos Basin, Brazil.", Thirteen International Congress of the Brazilian Geophysical Society, 2013, pp. 966-970.

M.D. Schakel et al., "Fully Data-driven Quantitative Reservoir Characterization by Broadband Seismic", SEG Annual Meeting, 2014, SEG Technical Expanded Abstracts, pp. 2502-2506.

M. Schakel, "Broadband Wavelet Estimation", 2014, CGG.

R.E. White, "Partial Coherence Matching of Synthetic Seismograms with Seismic Traces", Geophysical Prospecting, 1980, vol. 28, pp. 333-358.

"Theory of the STRATA Program", STRATA, May 1999, pp. 1-64 (http://www.cgg.com/data/1/rec_docs/585_STRATA_Theory.pdf).

* cited by examiner

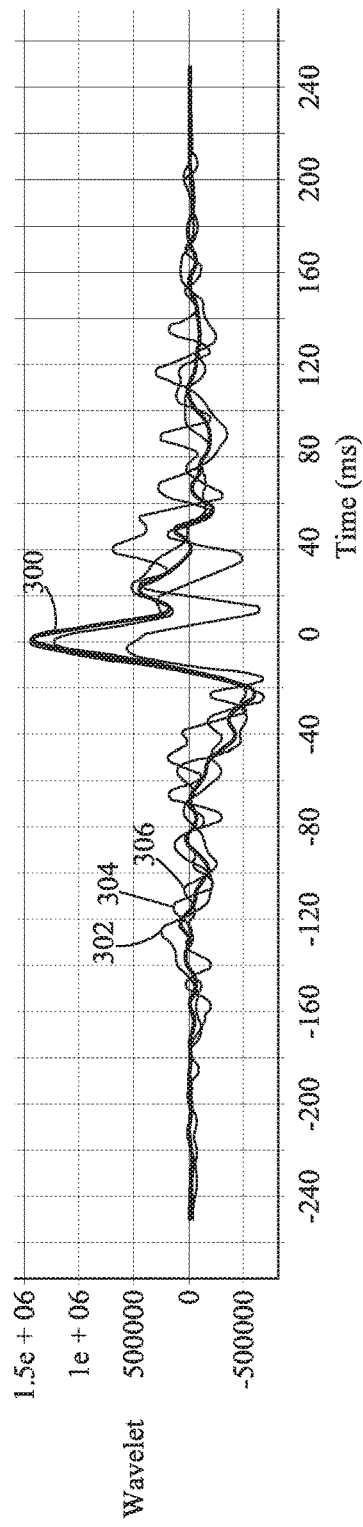
FIG. 3A
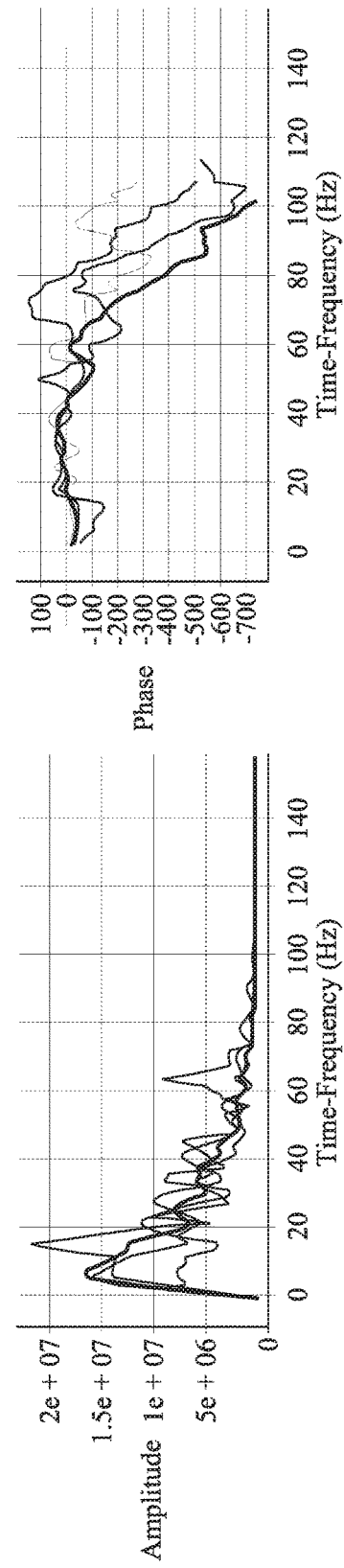
FIG. 3B
FIG. 3C

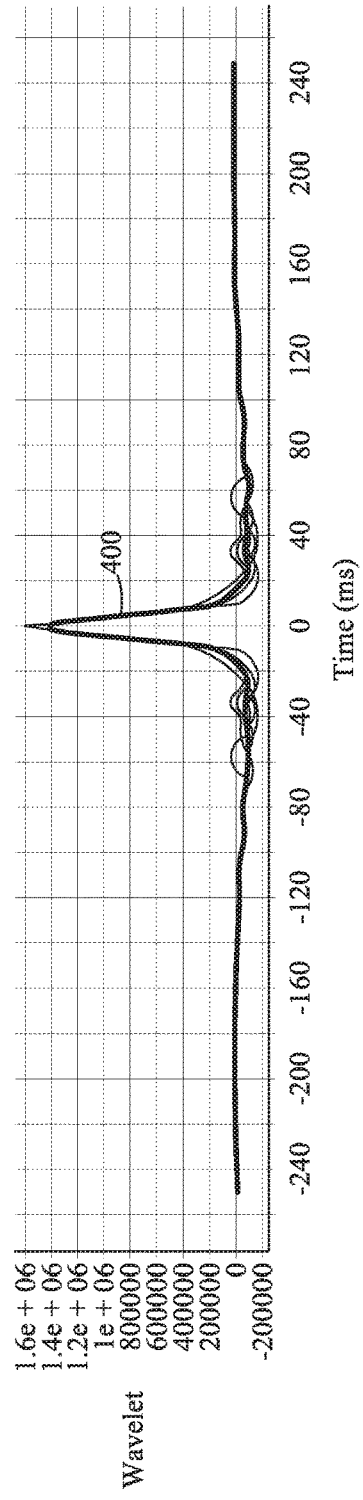
FIG. 4A
FIG. 4B
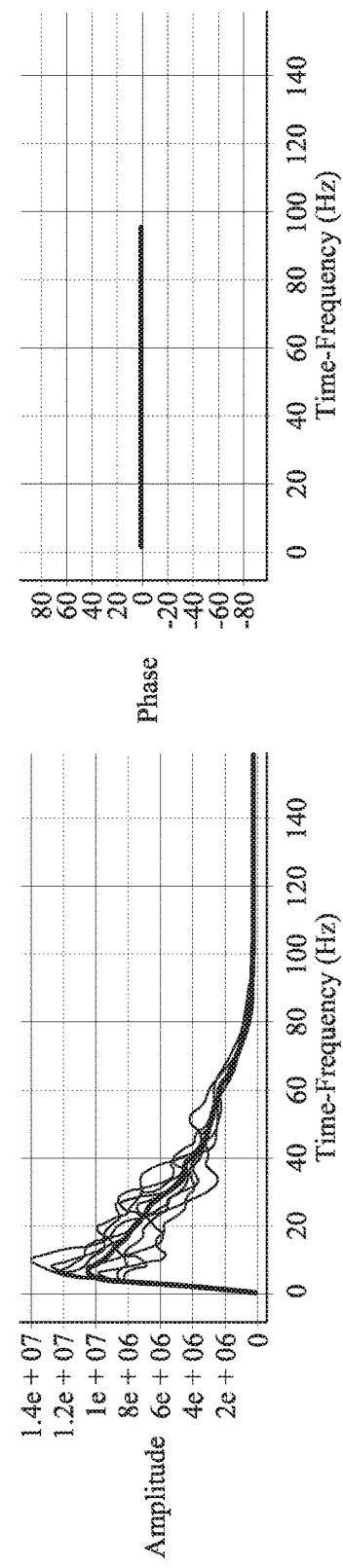
FIG. 4C

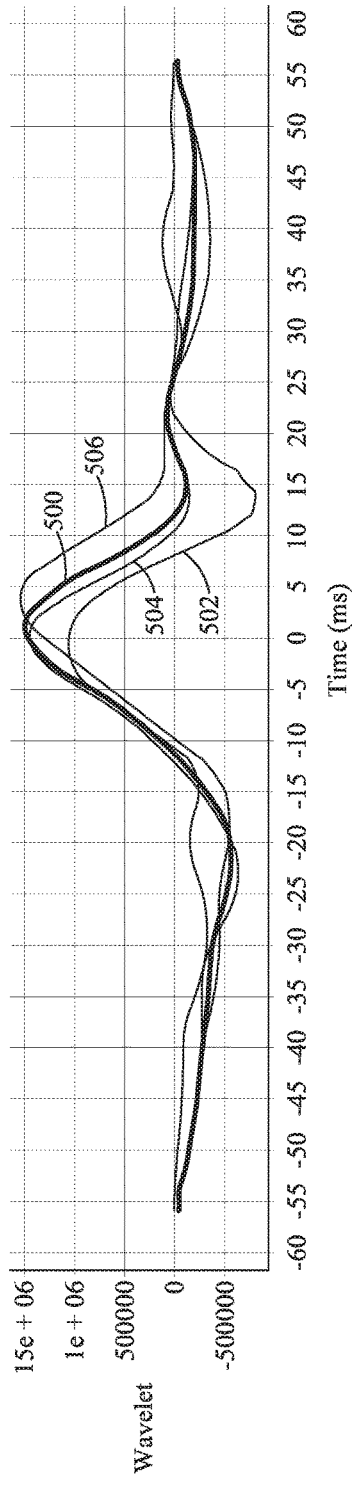
FIG. 5A
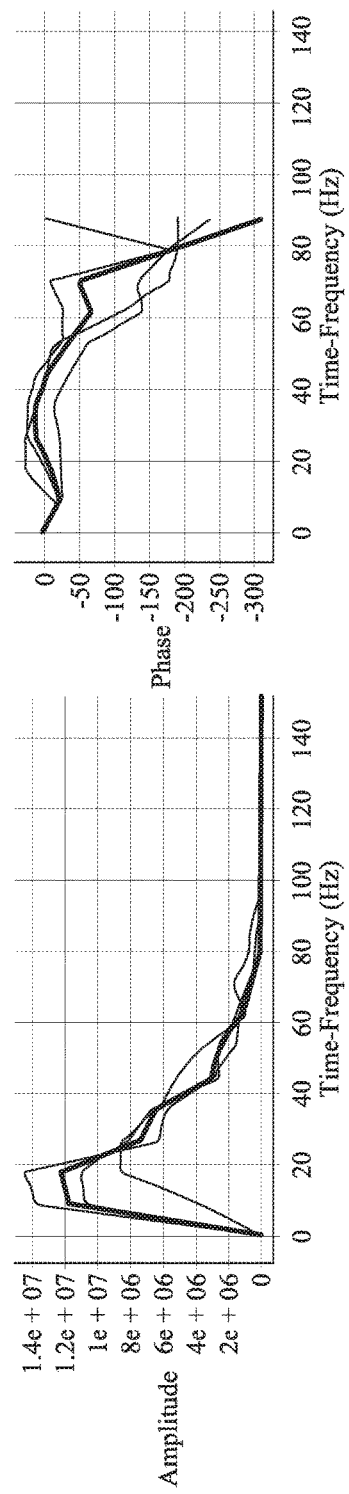
FIG. 5B
FIG. 5C

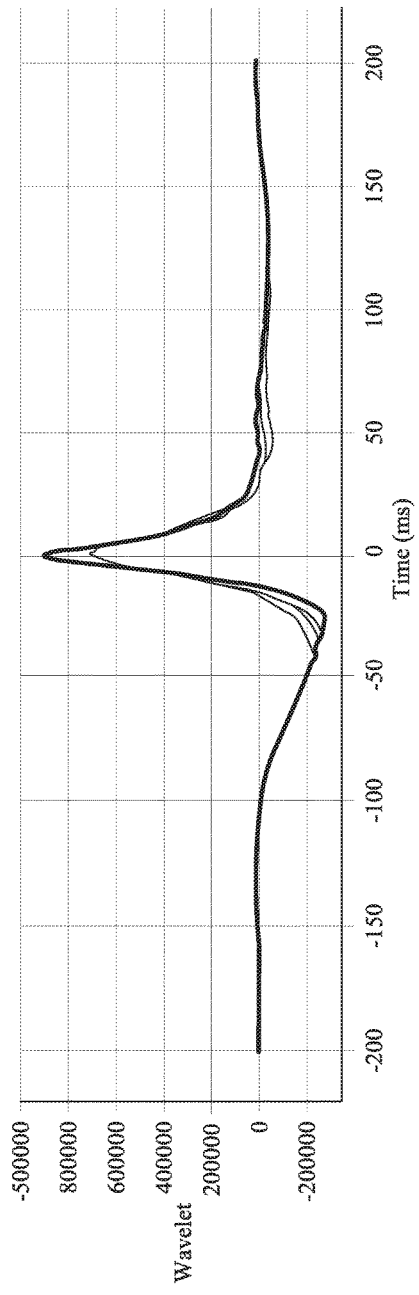
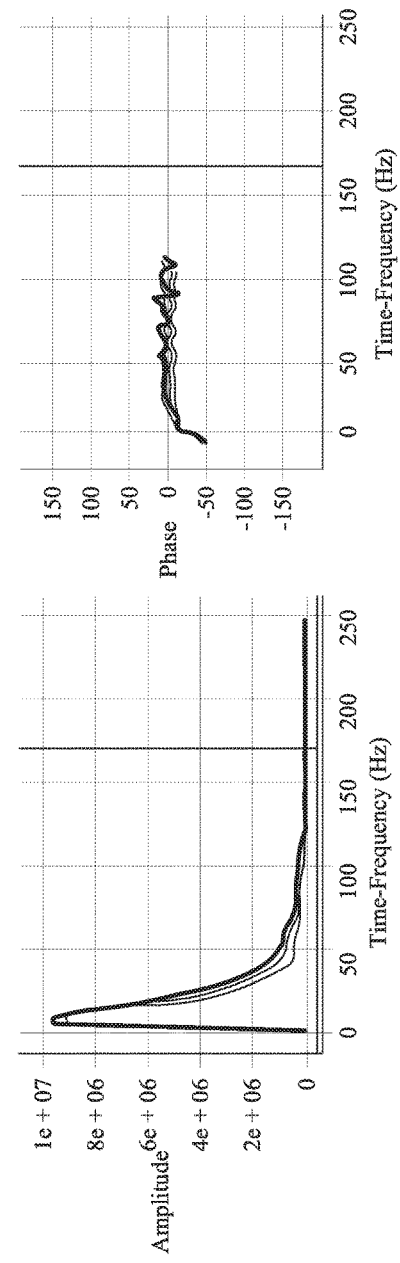
FIG. 8A
FIG. 8B
FIG. 8C

MULTI-STACK (BROADBAND) WAVELET ESTIMATION METHOD

CROSS-REFERENCE TO RELATED APPLICATIONS

The present application is related to and claims the benefit of priority from U.S. Provisional Application No. 62/290,472, filed Feb. 3, 2016, entitled "Method for Enhanced Wavelet Estimation," the entire contents of which are incorporated herein by reference.

BACKGROUND

Technical Field

Embodiments of the subject matter disclosed herein generally relate to methods and systems and, more particularly, to mechanisms and techniques for calculating a (broadband) wavelet corresponding to recorded seismic data.

Discussion of the Background

Seismic data are acquired to generate a profile (image) of the geophysical structure under the surface (subsurface). While this profile does not always provide an accurate location for oil and gas reservoirs, it suggests, to those trained in the field, the presence or absence of the oil and/or gas reservoirs and other pore fluids. Thus, providing a high-resolution image of the subsurface is an important part of the continuous process of the exploration of natural resources.

The seismic data may be acquired in various ways; for example, with land equipment, marine equipment, ocean bottom equipment, autonomous underwater equipment, or aerial equipment. The type of sensors and sources used in any of these scenarios are known in the art and thus, not repeated herein.

After the seismic data are acquired, they need to be processed to generate a better image of the subsurface. There are many known algorithms for processing the seismic data to obtain an image of the surveyed subsurface. Seismic inversion then transforms the seismic reflection data into a model of the physical layer properties of the Earth (e.g., impedance or velocity and density). If the inversion process is done properly, the calculated Earth model accurately represents the real physical properties.

One step in the inversion process is the estimation of the seismic wavelets (a definition for this term is provided later). The wavelet is estimated based on the seismic data; typically, log data from wells is used to constrain the wavelet. The seismic inversion results are strongly influenced by the quality of the estimated wavelet.

The inversion can be performed on one (full) stack or on several partial stacks simultaneously. A partial stack inversion requires the estimation of a wavelet per stack. It is common practice to estimate the wavelets for partial stack inversion for each stack independently.

The existing wavelet estimation methods are limited as they are very labor intensive, and the resulting wavelets can show large variations from stack to stack. This is in part because the wavelets are estimated independently. The process becomes particularly labor intensive for broadband wavelet estimation, either in full stack, or partial stack mode. Thus, there is a need for a new process that estimates the wavelet(s) in a more efficient way, while, at the same time honoring the underlying physics. Accordingly, it is desirable to provide systems and methods with such capabilities.

SUMMARY

According to an embodiment, there is a method for estimating a broadband wavelet associated with a given seismic data set. The method includes receiving broadband seismic data; constructing and populating a misfit function; calculating the broadband wavelet based on the misfit function and the broadband seismic data; and estimating physical reservoir properties of a surveyed subsurface based on the broadband wavelet. The broadband wavelet is constrained, through the misfit function, by (1) an amplitude only long wavelet, and (2) an amplitude and phase short wavelet. The amplitude and phase short wavelet is shorter in time than the amplitude only long wavelet.

According to another embodiment, there is a computing device for estimating a broadband wavelet associated with a given seismic data set. The computing device includes an interface for receiving broadband seismic data and a processor connected to the interface. The processor is configured to construct and populate a misfit function, calculate the broadband wavelet based on the misfit function and the broadband seismic data, and estimate physical reservoir properties of a surveyed subsurface based on the broadband wavelet. The broadband wavelet is constrained, through the misfit function, by (1) an amplitude only long wavelet, and (2) an amplitude and phase short wavelet, and the amplitude and phase short wavelet is shorter in time than the amplitude only long wavelet.

According to still another embodiment, there is a computer-readable media including computer executable instructions, wherein the instructions, when executed by a processor, implement one or more of the methods as noted in the above paragraphs.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 3A-3C illustrate a long (broadband) wavelet estimated with an amplitude and phase method;

FIGS. 4A-4C illustrate a long (broadband) wavelet estimated with an amplitude only method;

FIGS. 5A-5C illustrate a short wavelet estimated with an amplitude and phase method;

FIG. 8A illustrates an example of several partial stack broadband wavelets, FIG. 8B show their amplitude spectra, and FIG. 8C shows their phase spectra, and these wavelets can be used in an inversion of several seismic partial stacks.

DETAILED DESCRIPTION

Figure 1:
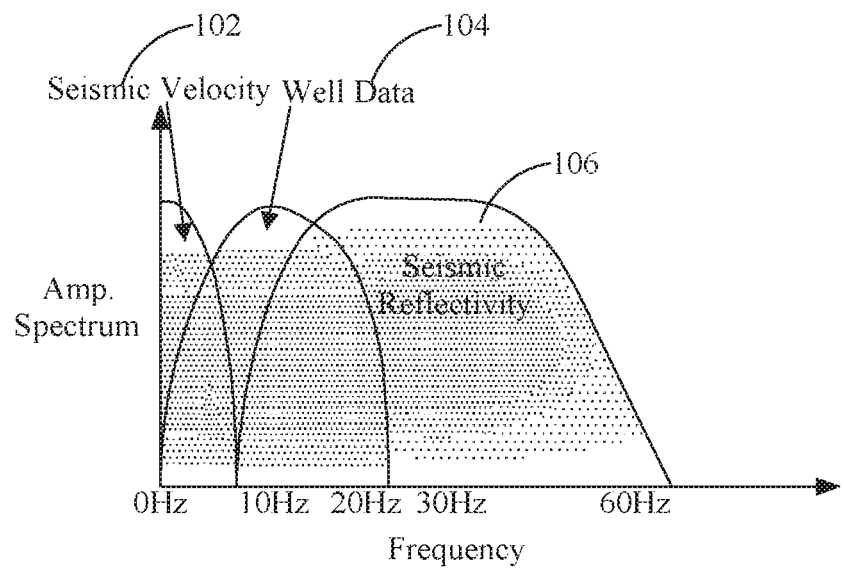
FIG. 1 illustrates the type of data necessary to cover the frequency spectrum in traditional seismic inversion methods.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to seismic inversion applied to multiple seismic stacks. However, the embodiments discussed herein are not limited to multiple stacks; they may also be applied to a single offset/angle or full stack.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Before discussing this method for enhancing wavelet estimation in more detail, a short discussion about partial stack seismic data and full stack seismic data is believed to be in order. A set of recorded seismic data is associated with at least one seismic source that generates seismic waves and at least one seismic receiver that records the seismic waves generated by the source, after interacting with the Earth. Thus, for a given point or area underground (also called a reflector), the energy recorded by the seismic receiver can be characterized by the position of the source, the position of the receiver (or the difference between these two positions, also called offset) and a travel-time of the seismic wave from the source to the receiver via the reflector. During a seismic survey, the position of the source or the position of the receiver or the position of both the source and receiver may change, which means that the recorded seismic data may include various energies recorded at different times that correspond to the same reflector. The energy associated with a given event (e.g., one shot of the source at a given location or one receiver at a given location) is referred to as partial stack trace.

A gather is a collection of seismic traces or energies which share a common geometric attribute. The term "gather" or "stack" usually refers to a common image point (CIP) or common mid-point (CMP). Gathers are sorted from field records in order to examine the dependence of amplitude, signal to noise, move-out, frequency content, phase, or other seismic attributes, versus an offset, incidence angle, azimuth, or other geometric attributes that are important for data processing and imaging. If traces of the gather are summed together, the result is referred to as stacked seismic data. A stack can be computed, for instance, by summing together many or all of the traces in the gather, which results in a single full stack. Alternatively, sets of traces in the gather can be stacked according to a range in the geometric attribute, each of the sets resulting in a different (partial) stack. For instance, the offset range in the gather can be subdivided into sets of offset traces which are summed together, each set resulting in a different offset stack. A single stack inversion requires a single wavelet which may vary laterally and vertically. A set of stacks can be used for partial stack inversion, which requires as many wavelets as there are stacks, where each of the wavelets may vary laterally and vertically. Partial stack seismic data contains additional information about the rock properties of the Earth, relative to the single stack seismic data, and the partial stacks can be inverted simultaneously with an inversion method for determining a model of the Earth with these extra properties.

When using multiple seismic stacks for the inversion, multiple wavelets are needed as each stack requires a corresponding wavelet for the inversion method. The term "wavelet" is considered herein to describe a seismic wave, generated by the seismic source, which has travelled through the earth and has been then processed (e.g., designature and/or demultiplex), migrated and transformed. Conventionally, the wavelet is estimated on a stack by stack basis. This process is very labor intensive. Moreover, this process can lead to independent wavelets, which under certain conditions, may vary from stack to stack. Wavelets that show large variations between stacks typically represent a physically non-realistic situation. Because all stacks from a survey originate from a single seismic signal and processing sequence, the wavelets should be reasonably similar, with differences being related purely to the filtering of the Earth. Thus, a desired enhancement to wavelet estimation techniques is one that reduces the amount of time and effort needed to extract the wavelet and controls the variability of wavelets from multiple stacks, while honoring the underlying physics.

According to an embodiment, there is a method for estimating a multi-stack or single (full) stack (broadband) wavelet associated with a given processed seismic dataset. The method includes a step of receiving (broadband) seismic data, a step of defining a misfit function, a step of calculating the (broadband) wavelet(s) based on the misfit function and the (broadband) seismic data, and a step of generating a seismic inversion of a surveyed subsurface based on the (broadband) wavelet. The term "broadband data" is understood in the following to include the traditional seismic data (e.g., between 5 and 100 Hz), or the traditional seismic data and additional seismic data that extends the frequency band down to 2.5 Hz or even 1.5 Hz and up to about 200 Hz. The method noted in this embodiment thus produces a corresponding wavelet, which may be calculated based only on the 5 to 100 Hz data, or 2.5 to 200 Hz data, or any other frequency range within the 2.5 to 200 Hz.

Wavelet estimation methods, by and large, are divided into two main categories: statistical or well log data driven. The statistical approach estimates only the amplitude spectrum of the wavelet, whereas the phase spectrum is assumed to be constant for the whole frequency range. This estimation technique (e.g., Jason Workbench amplitude only wavelet estimation technique) is based on the auto/cross correlations of the seismic traces and needs no well data for the process (for details refer to http://www.cgg.com/data/1/rec_docs/585_STRATA_Theory.pdf, page 12). With this technique, a wavelet can be calculated based on traces selected from anywhere within the seismic survey. However, at least one well representative for the area is needed in order to account for spectral coloring. A statistical wavelet estimation method assumes that the Earth's reflectivity is the result of a random process and that the resulting reflectivity has no spectral coloring. In practice, this assumption is not correct and the reflectivity spectral coloring needs to be accounted for.

The well data based approach (e.g., Jason Workbench amplitude and phase wavelet estimation technique) estimates both the amplitude and the phase of the wavelet using the seismic and elastic well log data. The amplitude and phase wavelet estimation technique requires at least one well to be present or some other mechanisms to supply reflectivity data. If more wells are present, this technique works better. In the absence of well log data, various mechanisms (e.g., statistics, transforms of other logs, etc.) may be used to supply the missing reflectivity data. The wavelet estimation according to this technique is achieved by searching for a wavelet that minimizes the difference between the actual seismic data (recorded seismic data) and synthetically produced seismic data, where the synthetic seismic data are obtained by convolving the reflectivity, real or calculated, of the well (log data) with an estimated wavelet. The Jason Workbench technique is based on White's method from White, R. E., 1980, "Partial coherence matching of synthetic seismograms with seismic traces," Geophysical Prospecting 28, 333-358.

Both wavelet estimation techniques described above are applied to a single (full or partial) stack of seismic data. However, these techniques can be generalized to enable simultaneous estimation of the wavelets for all stacks without any dependency on each other.

The proposed new multi-stack wavelet estimation algorithm is based on the amplitude and phase technique using elastic well log data. As stated earlier, the amplitude and phase wavelet estimation method minimizes, i.e., uses linear least-squares, the following misfit function:

$$\varepsilon_{total} = \varepsilon_{seismic}, \quad (1)$$

where $\varepsilon_{total}$ is the total misfit and $\varepsilon_{seismic}$ is the seismic misfit or, in other words, the L2 norm of the difference between the recorded seismic data and the synthetic seismic data calculated from the current elastic property model and the current wavelet $W_{current}$. In this regard, the current elastic property model may be constructed from interpolated and extrapolated elastic well logs to trace location. The L2 norm is calculated as the SQRT{Seismic–Synthetic($W_{current}$)}². Further details of how to construct the misfits in order to avoid energy leaking and other problems may be found in White, R. E. (1980). Those skilled in the art would understand that other norms may be used for calculating the seismic misfit or other mathematical operations. Equation (1) describes the total misfit for the amplitude and phase wavelet, minimization of which results in an estimation of the desired amplitude and phase wavelet.

A prior knowledge on the wavelet may improve the estimation process and result in a better-quality wavelet as judged from various quality check tests. Hence, an additional constraint based on the "prior wavelet" can be added to equation (1) to influence the final result. In this case, the total misfit function becomes:

$$\varepsilon_{total} = \varepsilon_{seismic} + \varepsilon_{wavelet} * a, \quad (2)$$

where $\varepsilon_{wavelet}$ is the wavelet related misfit or, in other words, the L2 norm of the difference between the current wavelet $W_{current}$ and the prior wavelet $W_{prior}$, i.e., SQRT {$W_{current} - W_{prior}$}², and "a" is the weight of the prior wavelet constraint, which represents the strength of the influence on the estimation. The weight "a" may vary between 0 and ∞, the value of 1 being where the two misfit terms are balanced.

The quality of the resulting wavelet may be further improved by incorporating new constraints into the total misfit function. Examples of these constraints are (i) requirement for the absence of a DC signal (the DC signal is the zero frequency signal), which can be achieved through modification of the seismic misfit term, (ii) requirement on diminishing tails, (iii) requirement on smoothness of the amplitude spectrum of the resulting wavelet, and (iv) prior wavelets for constraining the amplitude and/or phase spectra. The total misfit function then takes the form $$\varepsilon_{total} = \varepsilon_{seismic\_dc} + \varepsilon_{amp} * b + \varepsilon_{phase} * c + \varepsilon_{smooth\_freq} * d + \varepsilon_{taper} * e, \quad (3)$$

where $\varepsilon_{seismic\_dc}$ is the seismic misfit of equation (1) mentioned above, but modified to exclude the wavelets with non-zero DC signal. $\varepsilon_{amp}$ and $\varepsilon_{phase}$ are residuals for prior wavelets to constrain amplitude and phase spectra correspondingly with their appropriate weight coefficients "b" and "c"; note that "b" and "c" can also be frequency dependent, thus particular frequencies can be excluded from both the amplitude and the phase spectra residuals. $\varepsilon_{smooth\_freq}$ is the misfit for ensuring the smoothness of the amplitude spectrum for the current wavelet, and "d" is the weight of the smoothness constraint. Minimization of the second order derivative of the amplitude spectrum is an example of implementation of such a misfit term. $\varepsilon_{taper}$ is the misfit for ensuring tapered tails for the current wavelet, and e is the weight of the taper constraint. $\varepsilon_{taper}$ can be implemented as a L2 residual of the wavelet tails in the time domain. All the weights may vary between 0 and ∞.

The total misfit function may further be extended by calculating it over all seismic stacks and/or with an additional pairwise constraint that, for instance, reflects the continuity of the wavelet in the angle/offset direction. The continuity constraint is a representation of the fact that generally wavelets are similar from one angle/offset stack to another as an outcome of underlying physics. For multiple stacks with independent wavelets, the total misfit function expands to:

$$\varepsilon_{total} = \Sigma_{seismic}(\varepsilon_{seismic\_dc} + \varepsilon_{amp} * b + \varepsilon_{phase} * c + \varepsilon_{smooth\_freq} * d + \varepsilon_{taper} * e), \quad (4)$$

where $\Sigma_{seismic}$ is the sum over these parameters over all stacks (or seismic volumes).

If the total misfit function is extended with pairwise continuity constraint, then equation (4) becomes:

$$\varepsilon_{total} = \Sigma_{seismic}(\varepsilon_{seismic\_dc}\varepsilon_{amp} * b + \varepsilon_{phase} * c + \varepsilon_{smooth\_freq} * d + \varepsilon_{taper} * e) + \Sigma_{pair}(\varepsilon_{pair\_amp} * f + \varepsilon_{pair\_phase} * g), \quad (5)$$

where $\varepsilon_{pair\_amp}$ is the misfit between the amplitude spectrum of wavelets from adjacent seismic pairs;

"f" is the weight of this constraint;

$\varepsilon_{pair\_phase}$ is the misfit between the phase spectrum of wavelets from adjacent seismic pairs;

"g" is the weight of this constraint; and $\Sigma_{pair}$ the sum over these parameters over all adjacent pairs of seismic volumes. Total misfit function (5) is representing the general mathematical model for the new enhanced multi-stack wavelet estimation method. This method enables more automated wavelet estimation for one or multiple stacks or partial stacks, honors underlying physics and is completely data driven (i.e., no arbitrary modeling steps). Additionally, it enables incorporation of different type of constraints: tapered tails, smooth amplitude and/or phase spectra, continuity in stack direction via introduction of a constraint on the interrelationship of adjacent partial stacks, weight driven frequency filtering, weight driven seismic stack filtering and etc.

It is also worth mentioning that wavelets do not necessarily have the same length. The misfit function enables the estimation of wavelets with different lengths for different stacks. This, for instance, enables the possibility to account for NMO stretch in the multi-stack wavelet estimation algorithm.

While equations (2) to (5) show the extension of the total misfit function in a progressive way, those skilled in the art would understand that the total misfit function may be defined, for a specific project, to include any of the terms noted in equation (5), in any combination. The selection of the appropriate terms for the total misfit function is made based on the goals of the project, the actual structure of the underground, the selected inversion algorithm, and many other factors known by those skilled in the art.

The above introduced a new enhanced method for multi-stack wavelet estimation, improving on the conventional wavelet estimation routines, but more importantly, enabling robust and high quality broadband wavelet estimation. However, before introducing the broadband wavelet estimation algorithm based on the new multi-stack wavelet estimation method, a short discussion on the importance of the broadband wavelets and the difficulties one faces during the conventional estimation process is believed to be in order.

The seismic inversion process and the estimation of the wavelets are first discussed for conventional spectrum seismic data, i.e., seismic data that includes frequencies starting in the range of 6-10 Hz. For these seismic data, the seismic inversion process requires filling the gap between zero Hz and the lowest seismic frequencies present in the seismic data (usually 6 to 10 Hz). In many cases, this gap is filled, as illustrated in FIG. 1, with the seismic processing velocities 102 for the range of zero to about 2 Hz, and with interpolated data 104 from the well logs for the range of about 2 to about 6 Hz; in cases where seismic velocities are not used, only the interpolated well log information is used for the entire frequency gap of 0 to 6 Hz band, i.e., below the frequencies in the seismic data. The frequencies above about 6 Hz are generally present in the processed seismic data 106 and are captured in the inversion process. Well log data includes seismic data collected with seismic sensors placed in a well. The well log data is desirable to be tied to the seismic data recorded by traditional methods or the elastic properties are recorded from a typical batch of well logging tools such as (P-) Sonic, (S-) Sonic, and (neutron) density tools.

A model consisting of the missing frequencies 104 is typically created by interpolating the well logs. However, prior to any interpolation (in the time domain typically) the well logs need to be made available in time (versus depth) through the so-called well-tying to seismic. Through the interpolation process, the further away one is from the wells, the more uncertain the model becomes. Moreover, this model is highly dependent on the chosen interpolation method and on the structural framework (usually called the "solid model" or "inversion model") in which the interpolation occurs. Thus, elimination of this modelling step is highly desirable and it can be achieved if the broadband seismic data are used instead of the conventional seismic data.

Figure 2:
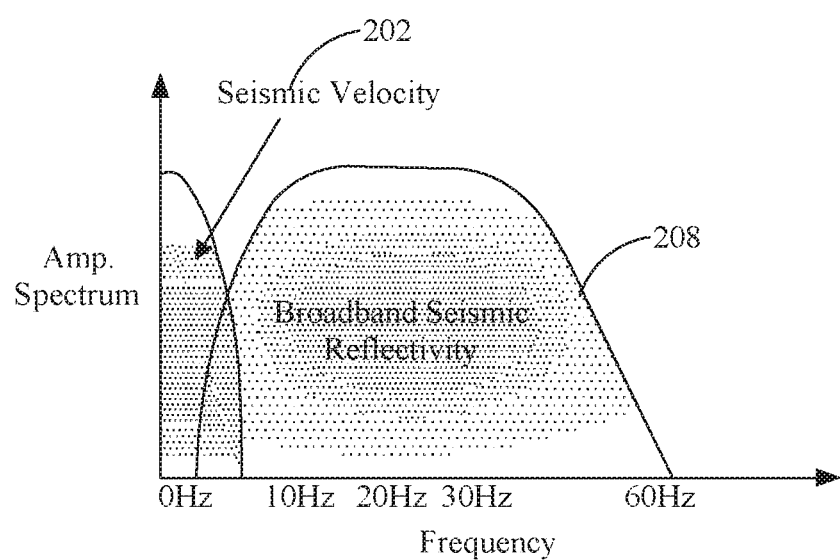
FIG. 2 illustrates the type of data used for seismic inversion in a novel method discussed herein.

The broadband seismic spectrum can extend (in terms of frequency) down to significantly lower frequencies (often around 2.5-4 Hz) than the frequencies available in conventional seismic data which starts at around 6-12 Hz. In many cases, the frequency content of the broadband seismic data extends low enough to cover the frequency range down to those present in seismic stacking velocities. When broadband seismic frequencies down to around 2.5 Hz are combined with seismic velocity trends (the "gap" between velocity trends and seismic data is closing from two sides: on the one hand velocity trends are becoming more meaningful up to higher frequencies, on the other hand broadband seismic datasets have lower frequency content), the model from interpolated well logs is no longer needed. The full bandwidth inversion can be performed using only the ultra-low frequency information from processing velocities 202 and the broadband seismic 208, as illustrated in FIG. 2. Removing the need for the well-based component of the low frequencies can make the seismic inversion fully driven by the seismic data, which leads to more reliable quantitative estimates of reservoir properties away from well control. In this regard, if the seismic velocities are calibrated to well velocities, in the ultra-low frequency range, and a solid model is used, then this process still uses a modeled framework for interpolating the seismic velocities. In addition, the processing of the velocities themselves can be data-driven or model-driven. However, the procedure can also be applied without a solid model while the velocities are data-driven, making the seismic inversion process indeed fully data-driven. Moreover, because construction of the low frequency model is often a time-consuming process, removing this step means that the entire inversion process can be performed faster. In one embodiment, the 0-2.5 Hz band can alternatively be filled with well logs. A seismic inversion specialist needs to decide which data source to use when composing low frequency models.

To properly make use of the low frequency content (say 2-6 Hz) of the broadband seismic data 208 during the seismic inversion process, one has to calculate a broadband wavelet with frequency content comparable to that of the broadband seismic data. However, a broadband wavelet is relatively long in time, making it difficult to calculate. For example, a 500 ms wavelet length is needed in order to capture frequencies down to 2 Hz, whereas an approximately 160 ms wavelet length is required to describe frequencies down to 6 Hz; if the broadband seismic data extends only to about 4 Hz, then the length of the broadband wavelet only needs to be about 250 ms. This means that the length (in time) of the broadband wavelet varies depending on the lowest frequency of the broadband seismic data. Generally, the length of a broadband wavelet is in the range of 250 to 600 ms.

A complication associated with the calculation of broadband wavelets is that they are difficult to estimate due to, in many cases, the insufficient length of available well log data, or in other cases, the availability of sufficient well log data in combination with the non-stationary nature of processed (broadband) seismic data. In order to estimate a broadband wavelet that is reasonably stable in both amplitude and phase, in general, it is advised to use an estimation window of at least three times the length of the wavelet being estimated. Therefore, for an exemplary 500 ms broadband wavelet (this is an example not intended to limit the embodiments), the advised estimation time window would be at least 1500 ms. However, wells are usually not logged to cover a time window of approximately 1500 ms, and if they did the non-stationarity of the processed broadband seismic data would bias the wavelet estimation.

Another difficulty associated with the estimation of a broadband wavelet is the length of the interval for the well tie. The process of well tie is used to correlate the well information (logs) to the recorded broadband seismic data (3D volume or 2D seismic lines). In the well tie process a set of synthetic seismic data is matched with the real seismic data. The synthetic seismic data is generated by convolving the estimated wavelet with the reflectivity data obtained from the well logs. Because a long broadband wavelet requires an estimation time window of at least three times the length of the wavelet, the iterative well tie and wavelet estimation processes needs to be performed over at least a three times longer window in which the synthetic seismic data is matched with the recorded broadband seismic data. As a result, the peak and trough matching process becomes a quite laborious task.

These discussed difficulties can be experienced, for example, when estimating a broadband wavelet with the above mentioned methods: the Jason Workbench amplitude and phase and the Jason Workbench amplitude only wavelet estimation techniques. According to the first technique (amplitude and phase wavelet estimation), both the amplitude and the phase of the wavelet are estimated based on the broadband seismic data. In this embodiment, a long (500 ms) wavelet (300, as illustrated in FIG. 3A) is estimated based on log data from three wells.

The output of the wavelet estimation technique is the wavelets shown in FIG. 3A. The wavelets 302, 304 and 306 are estimated from the individual wells. FIG. 3A also shows the multi-well wavelet, 300, which is calculated based on the logs of all three wells.

While FIG. 3A shows the estimated wavelets in the time domain, FIG. 3B shows their amplitude spectrum versus frequency and FIG. 3C shows their phase spectrum versus frequency. FIGS. 3A and 3B show that the tails and the amplitude spectrum of these long wavelets are quite unstable, which is unexpected as the processing sequence of recorded seismic generally produces constant spectra wavelets to first order. Applying a taper does not smooth the amplitude spectrum, nor does it make the tails diminish very quickly. This is one of the difficulties associated with the traditional estimation of a long broadband wavelet.

Overall, the quality of the broadband wavelet estimated via direct amplitude and phase wavelet estimation is quite poor. Thus, in the absence of good well coverage over the entire survey, the estimated broadband wavelet cannot be representative of the entire survey and it is for this reason, then also not suitable for use as the inversion wavelet.

Using a second technique (amplitude only wavelet estimation), it is possible to use a statistical approach and estimate only the amplitude spectrum of the broadband wavelet. The broadband wavelet is then assumed to have a constant phase (not necessarily zero) at all frequencies. With this technique, a long broadband wavelet can be calculated based on traces selected from anywhere within the broadband seismic survey.

Unlike the amplitude and phase wavelet estimation, in the amplitude only wavelet estimation, the trace selection is not limited to being in close proximity of the wells. For this reason, the seismic traces from various parts of the survey can be used. FIG. 4A shows the result of estimating 10 wavelets (one each from 9 locations and the average wavelet 400 of the 9 wavelets). The wavelets are calculated via the Jason Workbench amplitude only wavelet estimator. FIG. 4B shows the amplitude spectrum of the estimated wavelets and FIG. 4C indicates that the phase of the estimated wavelets is assumed to be zero. The estimated wavelets approach flat tails.

The amplitude spectrum of the wavelets shown in FIG. 4B are more stable than the spectrum from the amplitude and phase wavelet estimation illustrated in FIG. 3B. Moreover, the resulting average wavelet 400 (thicker black line in FIGS. 4A and 4B+4C) has a reasonably smooth amplitude spectrum. This is to be expected as the more traces which are included in the estimation process, the smoother the amplitude spectrum of the resulting average wavelet. However, even with a maximum number of traces available from the seismic data, the smoothness of the resulting wavelet when calculated with the amplitude only wavelet estimation functionality is not guaranteed to be adequate and some manual post-processing of this wavelet may be required in order to get an adequately smooth amplitude spectrum.

Given that the broadband wavelet where only the amplitude spectrum is estimated can take into account the seismic data from various parts of the survey and is not bound to the seismic traces located in the proximity of the well(s) as is the case for the amplitude and phase wavelet estimation technique, this technique, therefore, assuming that the well log reflectivity spectrum assumption used in the background is correct, produces a wavelet which is more representative of the amplitude spectrum of the entire survey than that of a wavelet derived from the amplitude and phase wavelet estimation technique. The amplitude only estimated wavelet 400 also has a relatively smooth amplitude spectrum and diminishing energy in its tails. However, this wavelet cannot generally be directly used in the inversion process due to its constant phase assumption and a wavelet residual phase spectrum correction is generally required to yield unbiased seismic inversion properties.

In one embodiment, it is possible to combine the two broadband wavelets, 300 and 400, discussed with regard to FIGS. 3A and 4A. As the next embodiments will constantly refer back to the estimated broadband wavelets 300 and 400, in the following discussion, the wavelet 300, illustrated in FIG. 3A, is referred to as the amplitude and phase long wavelet and the wavelet 400, illustrated in FIG. 4A, is referred to as the amplitude only long wavelet. When combined, the amplitude and phase long wavelet and the amplitude only long wavelet give a good understanding of much of the amplitude and phase spectra of the desired final broadband wavelet, but not the complete picture. The amplitude and phase long wavelet provides information about the ultra-low- and low-frequencies of the phase spectrum while the amplitude only long wavelet provides information on all frequencies of the amplitude spectrum.

However, there is a remaining gap in information in the mid- and high-frequencies of the phase spectrum. This gap in information can be covered by estimation of a conventional length (~60-~180 ms) wavelet (called herein amplitude and phase short wavelet), 500 (see FIG. 5), using the amplitude and phase wavelet technique described above with regard to FIGS. 4A-4C. For this short wavelet estimation, the length of the available well logs is usually sufficient to obtain a stable wavelet. An example is given in FIG. 5A in which short wavelets 502, 504 and 506 are calculated for each well and a multi-well short wavelet, 500, is calculated using all three wells. FIG. 5B illustrates the amplitude spectrum of the estimated wavelets and FIG. 5C illustrates the phase spectrum of the estimated wavelets.

According to an embodiment, the amplitude and phase long wavelet 300, the amplitude only long wavelet 400 and the amplitude and phase short wavelet 500 can be combined to cover the full broadband spectrum (the highest frequency of the broadband seismic data was found herein to be ~70 Hz; however, it can go up to 200 Hz). This means that the combination of these three wavelets cover the entire spectrum as follows:

1. The amplitude and phase short wavelet covers the low (typically ~6-10 Hz) to highest frequency (typically ~150-200 Hz) phase spectrum;
2. The amplitude and phase long wavelet covers the ultra-low (typically >0.1-2 Hz) to low frequency (typically ~6-10 Hz) phase spectrum; and
3. The amplitude only long wavelet covers the entire amplitude spectrum ultra-low to highest frequency.

While the above discussed embodiments have derived various broadband seismic wavelets that reflect only parts of the entire broadband spectrum (e.g., only amplitude, or amplitude and phase for low-frequencies or amplitude and phase for mid- and high-frequencies), the next embodiments illustrate how to construct a broadband wavelet that reflects components of these three wavelets, i.e., a broadband wavelet that covers the entire amplitude and phase broadband spectrum as represented by these components, but which will be calculated via a minimization of a specific form of the cost function discussed earlier in equations 1-5.

According to an embodiment, the following total misfit function $$\varepsilon_{total} = \Sigma_{seismic}(\varepsilon_{seismic\_dc} + \varepsilon_{stab}*h + \varepsilon_{mid\_high\_freq}*k + \varepsilon_{smooth\_freq}*d + \varepsilon_{taper}*e) + \Sigma_{pair}(\varepsilon_{pair\_amp}*f + \varepsilon_{pair\_phase}*g) \quad (6)$$

accounts for the robust method for multi-stack broadband wavelet estimation. Here, $\varepsilon_{stab}$ is the misfit term for the amplitude only long wavelet or, in other words, the L2 norm of the difference in the amplitude spectrum of the current wavelet and the so called "stabilizer wavelet," i.e., SQRT $\{Amp(W_{current}) - Amp(W_{stab})\}^2$. The "stabilizer wavelet" is the amplitude only long wavelet 400 discussed above with regard to FIGS. 4A-4C. The term "h" is the weight of the stabilizer constraint. This term may vary between 0 and ∞. $\varepsilon_{mid\_high\_freq}$ is the misfit part that accounts for the mid-to-high frequencies of the phase spectrum and this part may be, for example, the L2 norm of the difference in the mid-to-high frequencies of the phase spectrum between the current wavelet and the amplitude and phase short wavelet 500. Parameter "k" is the weight of the mid to high frequency constraint. It may vary between 0 and ∞.

Those skilled in the art would understand that the result of the minimization of this novel misfit cost function (6) is a high quality broadband wavelet which includes the amplitude and phase properties of the long wavelet 300, the amplitude only properties of the long wavelet 400 and the amplitude and phase properties of the short wavelet 500 simultaneously. At the same time, the tails of the broadband wavelet are constrained to be tapered out and the amplitude spectrum is constrained to be smooth according to the weight specified. Additionally, if the estimation is required to use partial stack seismic data, it is possible to assure a continuity of the multi-stack broadband wavelets in the offset/angle direction via pairwise smoothness constraints, namely the second summation over pairs in the equation (6). Multiple partial stack broadband wavelets estimated via the suggested algorithm are illustrated in FIGS. 8A-C.

If the constraints noted above convert the earlier introduced linear minimization problem into a more complicated non-linear minimization problem, a non-linear solver should be used. In one application, to enable easy incorporation of the required constraints, the total misfit function is calculated in the frequency domain. In this regard, note that in the conventional methods, the misfit function was solved in the time domain.

It is worth to mention that several modifications of the introduced broadband wavelet estimation algorithm can be derived by just varying the terms in the total misfit function (6). As an example, the below presented total misfit function $$\varepsilon_{total} = \Sigma_{seismic}(\varepsilon_{seismic\_dc} + \varepsilon_{stab\_low\_freq}*h + \varepsilon_{amp\_mid\_high\_freq}*I + \varepsilon_{mid\_high\_freq}*k + \varepsilon_{smooth\_freq}*d + \varepsilon_{taper}*e) + \Sigma_{pair}(\varepsilon_{pair\_amp}*f + \varepsilon_{pair\_phase}*g), \quad (7)$$

is another algorithm for broadband wavelet estimation, where the mid-to-high frequencies of the amplitude spectrum of the resulting broadband wavelet are constrained by the amplitude spectrum of the short wavelet 500 via $\varepsilon_{amp\_mid\_high\_freq}$ and its corresponding weight "I." The low frequencies of the amplitude spectrum are still constrained with the amplitude spectrum of the amplitude only wavelet 400.

Figure 6:
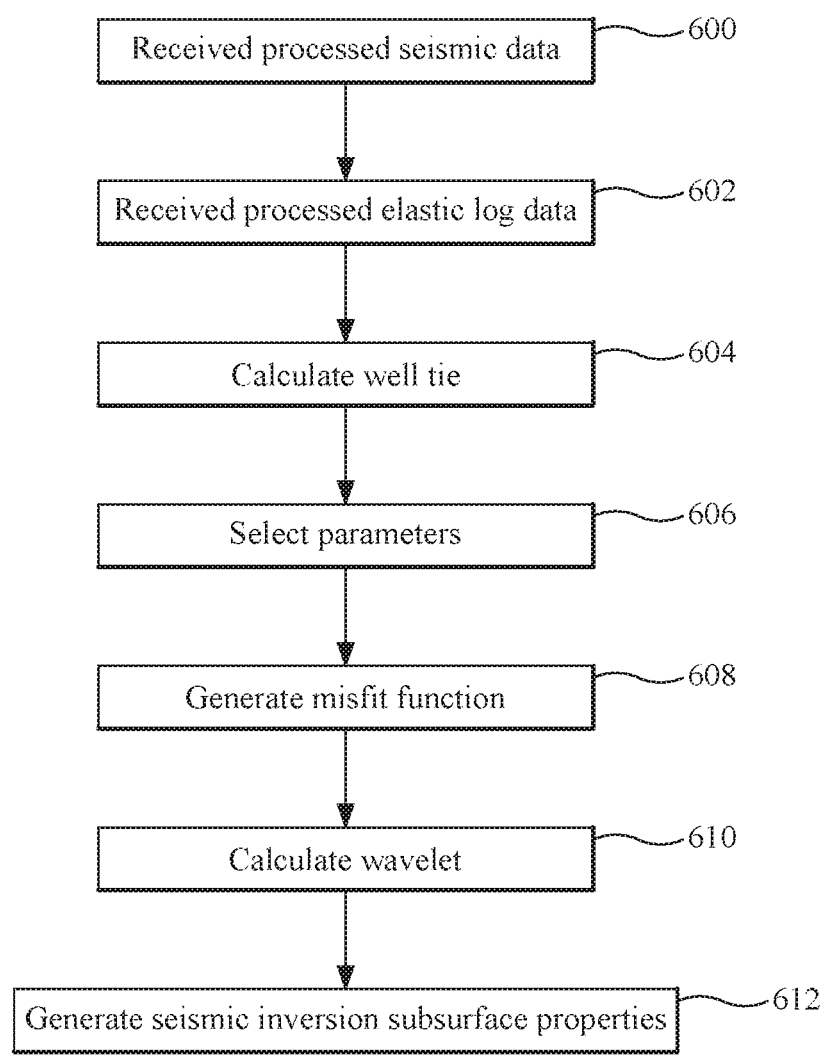
FIG. 6 is a flow chart of a method for estimating a broadband wavelet

A flow chart of a method for calculating a broadband wavelet covering the entire broadband spectrum of the recorded seismic data is now discussed with regard to FIG. 6. As already noted above, this broadband wavelet is simultaneously constrained by the amplitude and phase long wavelet, the amplitude only long wavelet and the amplitude and phase short wavelet.

In step 600, processed seismic data are received. The processed seismic data can be obtained from raw seismic data, which are collected with towed streamers, ocean bottom nodes, cables, independent nodes, nodes on a rope, autonomous receivers (e.g., hydrostatically balanced with or without its own propulsion), land sensors, transition zone sensors, etc. The raw seismic data may be recorded with any type of seismic sensor, as for example, hydrophone, accelerometer, geophone, differential hydrophone, particle velocity sensor, particle motion sensor, etc. The receivers, when used in a marine environment, record a marine streamer dataset that is achieved in a narrow, wide or multi-azimuth, coil shooting or any configuration towed with constant or variable depth (e.g., slant streamer, BroadSeis profile, over-under streamers).

The seismic sources used to generate the raw seismic data are not limited to any specific type of sources. Some source types include airgun, vaporchoc, flexichoc, marine vibrator, land vibrator, weight drop, dynamite, sparker, boomer, etc., all of which are known in the art and thus, their description is omitted herein. Source elements may be fired according to any known scheme, e.g., continuously, simultaneously, flip-flop, etc.

The processing device that hosts and executes the method discussed in FIG. 6 may be a high-performance computing platform that includes computing nodes, management nodes, cluster network communications, storage systems, parallel file system and cluster management software. The computing nodes usually include multi-core processors. Such a computing device is discussed later.

Returning to FIG. 6, the method includes a step 602 of receiving processed elastic log data for one or more wells. This log data is used to perform well tie, i.e., integrate the processed seismic data received in step 600 with the log data so that the calculated/predicted fields and/or operators honor both sets of data. More specifically, the elastic log data is typically obtained from a petrophysical log suite. This data is associated with at least one well partially located within the surveyed subsurface, i.e., its path extends partially through the surveyed subsurface. A single stack wavelet estimation requires a single log. The partial stack wavelet estimation requires three elastic logs: the P-Sonic, the S-Sonic, and the density. The three elastic logs can also be, for example, P-Velocity, S-Velocity, and density. The well logs are in depth. The well-tie typically relates the well logs in depth to seismic in time. This is specific to well-tying in the context of seismic inversion. Note that the discussed flow-chart is not necessarily uni-directional, e.g., the elastic log data can be revised based on the well-tie and for this reason, this step refers to "processed elastic log data." Alternatively or in addition, the well-tie step may be revisited based on a (first-pass) wavelet estimate. This means that in this method, going back and forth between certain steps would be understood by those skilled in the art to be a matter of choice.

Then, in step 604, the method performs the well tie and calculates the amplitude and phase short wavelet 500. This wavelet is later used in the total misfit function, if the component $\varepsilon_{mid\_high\_freq}$ is present.

In step 606, the parameters that are needed by the estimation are selected and their values are defined. As those skilled in the art would understand, these parameters may vary with the type of seismic survey, the inversion used, which misfit equation is selected, etc. In the following, a list of such parameters is provided with the understanding that this list is not exhaustive, i.e., more parameters may be used or some of the listed parameters may be omitted or some of the listed parameters may be replaced by other parameters as dictated by the conditions of the seismic survey. The list includes:

- Seismic stacks
- Vertical gate for estimation
- Trace gate
- Wavelet start time
- Wavelet length
- Seismic Mode (ZO/AVA)
- Elastic well logs, and well paths
- Solid model for interpolation of well data
- DC constraint (on or off)
- Stabilizer wavelet (from loading or an embedded estimate)
- Weight of stabilization constraint (0 to ∞)
- "Short" conventional wavelet for phase constraint or amplitude and phase constraint
- Weight of the phase constraint (0 to ∞)
- Weight of the smoothness constraint (0 to ∞)
- Type of taper for tapering constraint
- Weight of the taper constraint (0 to ∞)
- Pair-wise amplitude constraint (on or off)
- Weight of the pair-wise amplitude constraint (0 to ∞)
- Pair-wise phase constraint (on or off), and
- Weight of the pair-wise phase constraint (0 to ∞).

Having the parameters for the estimation selected and defined in step 606, the method advances to step 608 in which the final misfit function is created and populated with data from steps 600 and 602 and parameters and constraints from steps 606 and 604 (e.g., this step calculates the short wavelet via the amplitude and phase methodology), respectively. The final misfit function is constructed from equations (2) to (7) or as a variation of those equations, depending on data availability and quality, and seismic inversion objectives. The misfit function may be provided (i.e., input to the computing device) by the operator of the seismic inversion or by the computer device.

In step 610, the selected final misfit is minimized (for example, using a least square method) to find the best wavelet(s) given the input seismic data, log data, constraints and parameterization. In this regard, note that step 602 is optional and in the eventuality of not having the log data, a statistical approach (or others) may be used for supplying the missing information. However, the accuracy of the estimated wavelet is generally better if the log data are available.

Figure 7A:
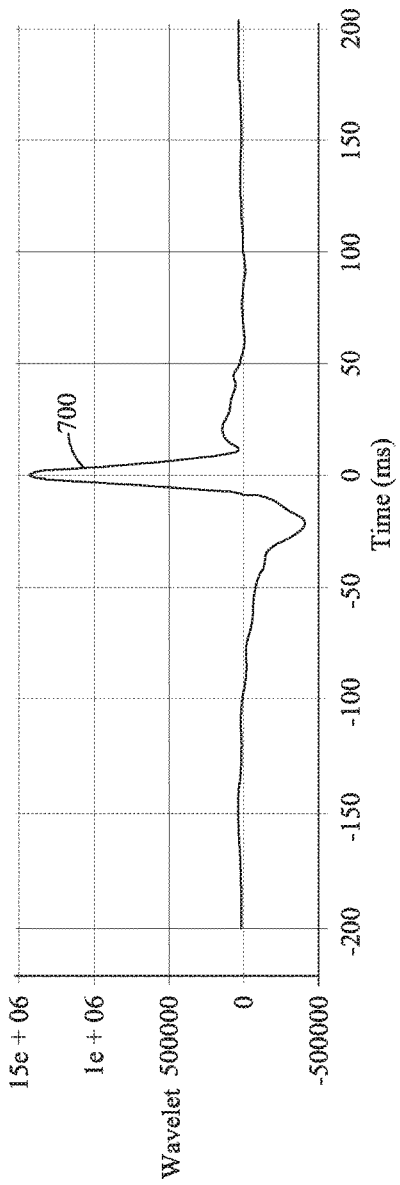
FIGS. 7A-7C illustrate the broadband wavelet for full stack inversion.

A result of step 610 is a conventional or broadband wavelet, or a set of conventional or broadband wavelets. A broadband wavelet is displayed as 700, as illustrated in FIG. 7A (note that the partial stack broadband wavelets are displayed in FIG. 8A). Along with displaying the broadband wavelet 700, step 612 may further process the seismic reflectivity data with the estimated broadband wavelet to generate subsurface elastic layer properties of the surveyed subsurface.

The above discussed method may include less or more steps than what is illustrated in FIG. 6. The broadband wavelet is constrained, through the misfit function, by, (1) an amplitude only long wavelet, and (2) an amplitude and phase short wavelet, and the short wavelet is shorter in time than the long wavelet.

More specifically, the method of FIG. 6 may be performed to include step 600 of receiving broadband seismic data, step 608 to include constructing and populating a misfit function, step 610 to calculate the broadband wavelet based on the misfit function and the broadband seismic data, and step 612 of estimating physical reservoir properties of a surveyed subsurface based on the broadband wavelet. The broadband wavelet is constrained, through the misfit function, by (1) an amplitude only long wavelet, and (2) an amplitude and phase short wavelet, and the amplitude and phase short wavelet is shorter in time than the amplitude only long wavelet. The method may also include implementing additional constraints into the misfit function, which are defined in three different frequency ranges of the amplitude and phase spectra, each range of the frequencies being different from the other ranges. The amplitude only long wavelet based constraint corresponds to the first to third frequency ranges of the amplitude spectrum and/or the amplitude and phase short wavelet based constraint corresponds to the second and third frequency range of the phase spectrum. The first range corresponds to low and ultra-low frequencies, the second range corresponds to mid-frequencies, and the third range corresponds to high-frequencies. In one application, the broadband wavelet is calculated for partial stack or full stack. In one embodiment, the short wavelet is about 60-180 ms and the long wavelet is about 250-600 ms.

The method may also include receiving elastic log data associated with at least one well partially located within the subsurface, and tying the elastic log data to the seismic data. In one application, the method further includes selecting one or more parameters that define the misfit function, wherein the one or more parameters include seismic stacks, wavelet start time, wavelet length, and well path. In still another application, the method may further include summing the misfit function over parameters associated with various stacks, wherein a stack is a subset of the conventional or broadband seismic data and it is grouped based on a given parameter of the earth, and/or a pair misfit component that is added to the misfit function and the pair misfit component is summed over amplitudes and/or phases of wavelets from adjacent seismic traces. In one application, the broadband seismic data includes only non-broadband single stack seismic data or only non-broadband partial stack seismic data, the short wavelet and the long wavelet are bout about 60-180 ms, and the broadband wavelet is a conventional wavelet.

Figure 7C:
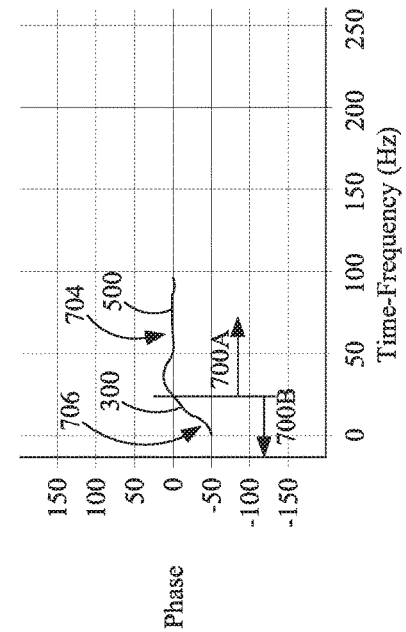
Figure 7B:
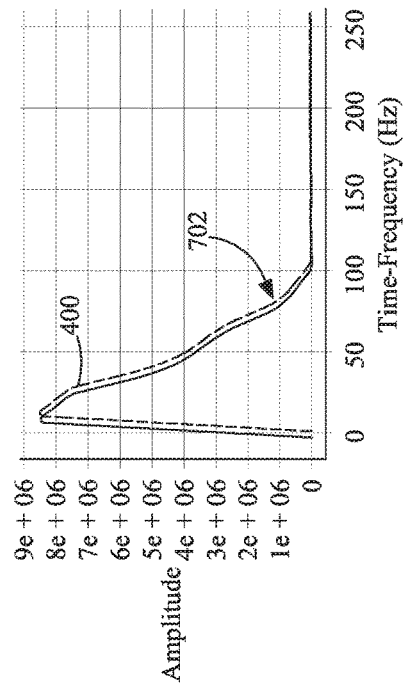

The amplitude spectrum for the estimated broadband wavelet 700 is shown in FIG. 7B and the phase spectrum is shown in FIG. 7C. The effects of wavelets 300, 400 and 500 on the estimated broadband wavelet 700 are also conceptually indicated in FIGS. 7B and 7C. For example, FIG. 7B shows the amplitude spectrum 702 of the broadband wavelet 700 corresponding to the amplitude spectrum of the amplitude only long wavelet 400. FIG. 7C shows the portion 700A of the phase 704 of the broadband wavelet 700 corresponding to the phase spectrum of the amplitude and phase short wavelet 500 (for mid- and high-frequencies) and the portion 700B of the phase 706 of the broadband wavelet 700 corresponding to the phase spectrum of the amplitude and phase long wavelet 300 (for low-frequencies). In this example, the border between regions 700A and 700B is at about 20 Hz. However, this may change depending on the surveyed subsurface and/or other parameters.

The above described embodiments enable the user to estimate one or more conventional or broadband wavelets from the recorded seismic data (which may be broadband seismic data or traditional seismic data). The wavelet estimation is set-up such that it ensures the smoothness, stability, consistency with the underlying physics, and overall high quality of the resulting wavelet(s) when equation (3) is used for single stack or equations (4) or (5) are used for multiple stacks. It also eliminates any need of manual pre- and/or post-processing of the wavelet(s). The estimation may be fully automatic and does not require any user interaction before, during or after estimation, except for the specification of the input data in step 600 and 602 and parameters and constraints in step 606 and 604, respectively.

Moreover, because the broadband wavelet estimation flow chart illustrated in FIG. 6 is only as time consuming as a conventional wavelet estimation, the incorporation of the broadband wavelet not only enables fully data-driven reservoir characterization, but it also saves computing time on low-frequency modelling due to partially or completely eliminating the reliance of seismic inversion on low-frequency model(s). Note that a single stack seismic inversion requires one low-frequency model while a partial stack seismic inversion requires multiple low-frequency models (e.g., a low-frequency model for each of the output inversion property).

In another application, this method is automated for conventional seismic partial stack wavelet estimation (e.g., seismic data in the 5 to 100 Hz frequency range). According to this application, the method saves time while honoring underlying physics. Without this method, one has to do wavelet estimation for each single stack separately. The misfit functions described in equations (2)-(7) can be applied to: conventional single stack seismic, broadband single stack seismic, conventional partial stack seismic, and broadband partial stack seismic data.

The benefits of these applications may be:

More automated wavelet estimation in conventional and broadband cases, allowing time savings;

For broadband, allowing time savings by spending less time on low frequency model building;

For broadband seismic, enabling fully data-driven reservoir characterization, for either single stack or partial stack seismic inversion; and Including interrelationship of adjacent stacks (honoring underlying physics) for partial stack wavelet estimation, either conventional or broadband.

Figure 9:
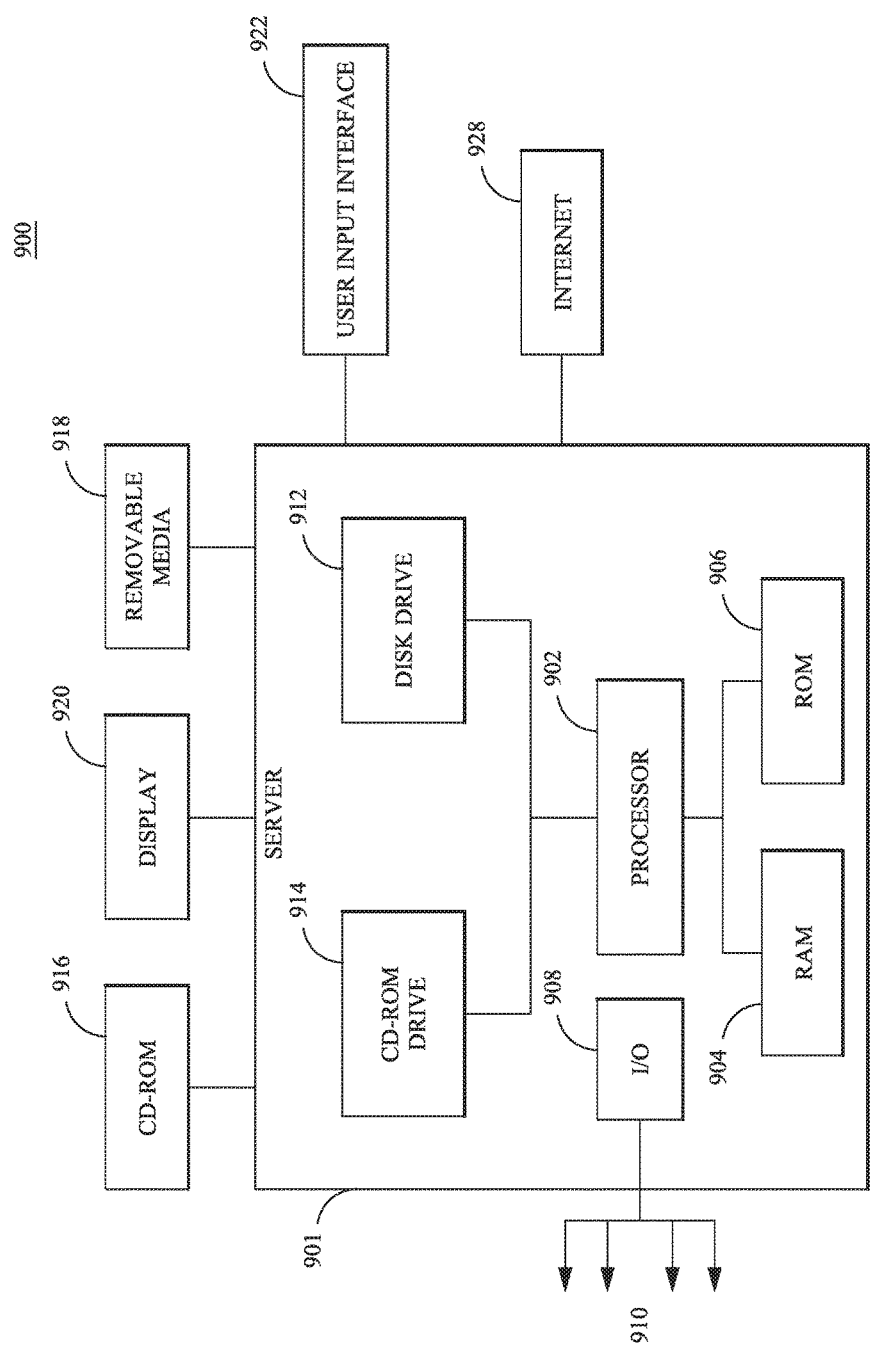
FIG. 9 is a schematic diagram of a computing device on which one or more of the above methods for processing seismic data may be implemented.

The above-discussed procedures and methods may be implemented in a computing device as illustrated in FIG. 9. Hardware, firmware, software or a combination thereof may be used to perform the various steps and operations described herein. Computing device 900 of FIG. 9, although illustrated as a generic device, is highly specialized and specifically designed for processing seismic data. Examples of this type of computing device are known in the art as not being a generic computing device. However, for the sake of simplicity the computing device is illustrated as generic in FIG. 9.

Exemplary computing device 900 suitable for performing the activities described in the exemplary embodiments may include a server 901. Such a server 901 may include a central processor (CPU) 902 coupled to a random access memory (RAM) 904 and to a read-only memory (ROM) 906. ROM 906 may also be other types of storage media to store programs, such as programmable ROM (PROM), erasable PROM (EPROM), etc. Processor 902 may communicate with other internal and external components through input/output (I/O) circuitry 908 and bussing 910 to provide control signals and the like. Processor 902 carries out a variety of functions as are known in the art, as dictated by software and/or firmware instructions.

Server 901 may also include one or more data storage devices, including hard drives 912, CD-ROM drives 914 and other hardware capable of reading and/or storing information, such as DVD, etc. In one embodiment, software for carrying out the above-discussed steps may be stored and distributed on a CD-ROM or DVD 916, a USB storage device 918 or other form of media capable of portably storing information. These storage media may be inserted into, and read by, devices such as CD-ROM drive 914, disk drive 912, etc. Server 901 may be coupled to a display 920, which may be any type of known display or presentation screen, such as LCD, plasma display, cathode ray tube (CRT), etc. A user input interface 922 is provided, including one or more user interface mechanisms such as a mouse, keyboard, microphone, touchpad, touch screen, voice-recognition system, etc.

Server 901 may be coupled to other devices, such as sources, detectors, etc. The server may be part of a larger network configuration as in a global area network (GAN) such as the Internet 928, which allows ultimate connection to various landline and/or mobile computing devices.

The disclosed exemplary embodiments provide a computing device, software instructions and a method for conventional and broadband/single partial-stack/single full stack/simultaneous multiple partial stacks wavelet estimation. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method of seismic exploration, the method comprising:
    receiving broadband seismic data acquired over a surveyed subsurface formation;
    constructing and populating a misfit function;
    calculating a broadband wavelet based on the misfit function and the broadband seismic data; and
    estimating physical properties of an oil and/or gas reservoir inside the surveyed subsurface formation using the broadband wavelet,
    wherein the broadband wavelet is constrained, through the misfit function, by (1) an amplitude only long wavelet, and (2) an amplitude and phase short wavelet, and
    wherein the amplitude and phase short wavelet is shorter in time than the amplitude only long wavelet.

2. The method of claim 1, further comprising:
    implementing additional constraints into the misfit function, which are defined in three different frequency ranges of the amplitude and phase spectra, each range of the frequencies being different from the other ranges.

3. The method of claim 2, wherein the amplitude only long wavelet based constraint corresponds to the first to third frequency ranges of the amplitude spectrum.

4. The method of claim 2, wherein the amplitude and phase short wavelet based constraint corresponds to the second and third frequency range of the phase spectrum.

5. The method of claim 2, wherein the first range corresponds to low and ultra-low frequencies, the second range corresponds to mid-frequencies, and the third range corresponds to high-frequencies.

6. The method of claim 1, wherein the broadband wavelet is calculated for partial stack or full stack.

7. The method of claim 1, wherein the short wavelet is about 60-180 ms and the long wavelet is about 250-600 ms.

8. The method of claim 1, further comprising:
receiving elastic log data associated with at least one well partially located within the subsurface; and
tying the elastic log data to the seismic data.

9. The method of claim 8, further comprising:
selecting one or more parameters that define the misfit function, wherein the one or more parameters include seismic stacks, wavelet start time, wavelet length, and well path.

10. The method of claim 1, further comprising:
summing the misfit function over parameters associated with various stacks, wherein a stack is a subset of the conventional or broadband seismic data and it is grouped based on a given parameter of the earth.

11. The method of claim 1, further comprising:
a pair misfit component that is added to the misfit function and the pair misfit component is summed over amplitudes and/or phases of wavelets from adjacent seismic stack(s).

12. The method of claim 1, wherein the broadband seismic data includes only non-broadband single stack seismic data or only non-broadband partial stack seismic data, the short wavelet and the long wavelet are about 60-180 ms, and the broadband wavelet is a conventional wavelet.

13. A computing device for seismic exploration, the computing device comprising:
an interface for receiving broadband seismic data acquired over a surveyed subsurface formation; and
a processor connected to the interface and configured to, construct and populate a misfit function,
calculate a broadband wavelet based on the misfit function and the broadband seismic data, and
estimate physical properties of an oil and/or gas reservoir inside the surveyed subsurface formation using the broadband wavelet,
wherein the broadband wavelet is constrained, through the misfit function, by (1) an amplitude only long wavelet, and (2) an amplitude and phase short wavelet, and
wherein the amplitude and phase short wavelet is shorter in time than the amplitude only long wavelet.

14. The computing device of claim 13, wherein the processor is further configured to:
implement additional constraints into the misfit function, which are defined in three different frequency ranges of the amplitude and phase spectra, each range of the frequencies being different from the other ranges.

15. The computing device of claim 14, wherein the amplitude only long wavelet based constraint corresponds to the first to third frequency ranges of the amplitude spectrum.

16. The computing device of claim 14, wherein the amplitude and phase short wavelet based constraint corresponds to the second and third frequency range of the phase spectrum.

17. The computing device of claim 14, wherein the first range corresponds to low and ultra-low frequencies, the second range corresponds to mid-frequencies, and the third range corresponds to high-frequencies.

18. The computing device of claim 13, wherein the broadband wavelet is calculated for partial stack or full stack, the short wavelet is about 60-180 ms and the long wavelet is about 250-600 ms.

19. The computing device of claim 13, wherein the processor is further configured to:
receive elastic log data associated with at least one well partially located within the subsurface; and
tie the elastic log data to the seismic data.

20. A non-transitory computer readable medium including computer executable instructions, wherein the instructions, when executed by a processor, implement a method of seismic exploration, the instructions making the processor to:
receive broadband seismic data acquired over a surveyed subsurface formation;
construct and populate a misfit function;
calculate a broadband wavelet based on the misfit function and the broadband seismic data; and
estimate physical properties of an oil and/or gas reservoir inside the surveyed subsurface formation using the broadband wavelet,
wherein the broadband wavelet is constrained, through the misfit function, by (1) an amplitude only long wavelet, and (2) an amplitude and phase short wavelet, and
wherein the amplitude and phase short wavelet is shorter in time than the amplitude only long wavelet.

* * * * *